United States Patent [19] — Szpakowski et al.

[11] 4,242,630

[45] Dec. 30, 1980

[54] FERRORESONANT VOLTAGE REGULATOR INCORPORATING AUXILIARY WINDING FOR LARGE CURRENT MAGNITUDES OF SHORT DURATION

[75] Inventors: Bronislaw T. Szpakowski, Kanata; Bruno DeGregorio, Ottawa, both of Canada

[73] Assignee: Northern Telecom Limited, Montreal, Canada

[21] Appl. No.: 924,636

[22] Filed: Jul. 14, 1978

[51] Int. Cl.[3] .......... H02P 1/04

[52] U.S. Cl. .......... 323/60; 307/131; 318/778; 323/62

[58] Field of Search .......... 307/17, 72, 86, 87, 307/99, 130, 131; 318/414, 778, 780, 784, 798, 813; 323/43.5, 5 R, 43.5 S, 44 R, 57, 60, 61, 62; 315/257, DIG. 5

[56] References Cited

U.S. PATENT DOCUMENTS

| | | | |
|---|---|---|---|
| 1,224,739 | 5/1917 | Gordon | 315/257 X |
| 2,437,455 | 3/1948 | Berman | 323/44 R |
| 2,445,976 | 7/1948 | Sola | 318/813 X |
| 2,448,925 | 9/1948 | Sola | 323/60 X |
| 3,005,130 | 10/1961 | Schwartz | 315/DIG. 5 |
| 3,011,095 | 11/1961 | Kriechbaum | 323/57 X |
| 3,112,439 | 11/1963 | Rosin | 323/60 X |
| 3,593,078 | 7/1971 | Downey et al. | 318/778 X |
| 3,600,668 | 8/1971 | Goldberg | 323/45 X |
| 3,700,925 | 10/1972 | Wood | 323/43.5 S |
| 3,753,069 | 8/1973 | Newton | 318/778 X |

OTHER PUBLICATIONS

Menard et al., "Voltage Regulator for Controlling a DC Motor", IBM TDB vol. 13, No. 6, Nov. 1970, pp. 1516, 1517.

*Primary Examiner*—A. D. Pellinen
*Attorney, Agent, or Firm*—Robert C. Hogeboom

[57] ABSTRACT

An auxiliary winding is provided on a ferroresonant voltage regulating transformer. The transformer is controlled in such a manner that, during start-up of a load connected to the transformer, the auxiliary winding provides all the current for the load, and after the initial start-up period of the load, the auxiliary winding is disconnected from the load and the normal secondary winding of the ferroresonant transformer supplies all the current to the load. It should be noted that the auxiliary winding is constructed so that (in theory) all the flux from the auxiliary winding is linked with the primary winding, and all the flux from the primary winding is linked with the auxiliary winding.

11 Claims, 3 Drawing Figures

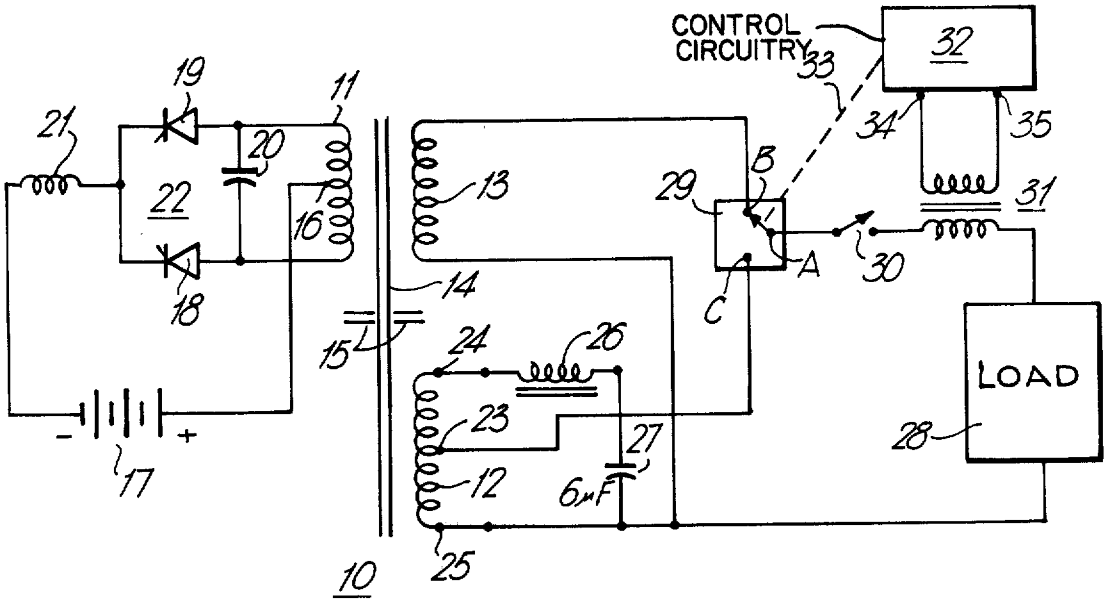
-Fig-1-
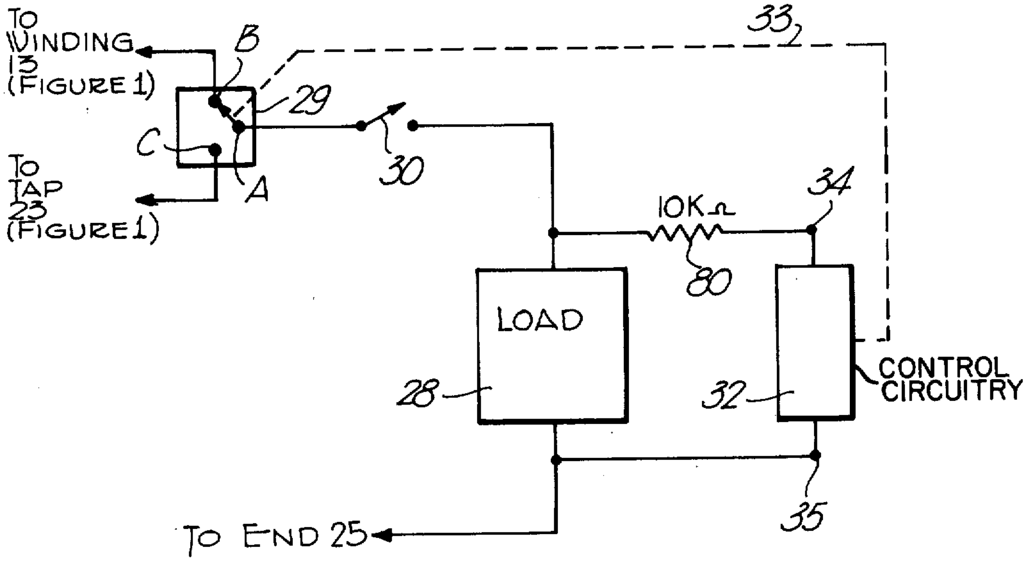
-Fig-3-

FERRORESONANT VOLTAGE REGULATOR INCORPORATING AUXILIARY WINDING FOR LARGE CURRENT MAGNITUDES OF SHORT DURATION

This invention relates generally to ferroresonant voltage regulating circuits and more particularly to a ferroresonant voltage regulator having an auxiliary winding which is employed to provide short-term, unregulated current, of greater magnitude than that normally provided by the ferroresonant regulator.

Ferroresonant constant-voltage transformers are well known in the prior art, as evidenced by the following United States patents: U.S. Pat. No. 2,143,745 dated Jan. 10, 1939 to Joseph G. Sola; U.S. Pat. No. 2,694,177 dated Nov. 9, 1954 to Joseph G. Sola; U.S. Pat. No. 3,315,151 dated Apr. 18, 1967 to F. A. Wentworth; U.S. Pat. No. 3,293,537 dated Dec. 20, 1966 to Joseph G. Sola; U.S. Pat. No. 3,573,605 dated Apr. 6, 1971 to H. P. Hart and R. J. Kakalec; and U.S. Pat. No. 4,088,942 dated May 9, 1978 to S. Miko. The preceding patents depict various core and winding configurations found in the prior art for ferroresonant transformers or regulators. In addition to the preceding patents, a good explanation of the operation of ferroresonance is given in a brochure entitled: "A Practical Approach to Understanding Ferroresonance" by H. C. Gerdes and W. E. Lucarz and distributed as Bulletin No. L-550 by Thomas and Skinner, Inc., Indianapolis, Ind., U.S.A. This brochure was reprinted from the April 1966 issue of *EEE-The magazine of Circuit Design Engineering.*

One inherent characteristic of ferroresonant constant-voltage transformers is that the output current is limited by the leakage inductance between the primary and secondary windings. At times this current limiting characteristic can be an advantage, making further over-current protection unnecessary. At other times, this current limiting characteristic can be a distinct disadvantage; for example, when starting an electric motor much more current is required for the start-up of the motor than is required during the steady-state operation of the motor and the inherent current limiting characteristic of a ferroresonant transformer means that some method must be employed to provide the required starting current.

Prior art solutions to the problem of providing adequate starting current for loads such as electric motors have been to design a ferroresonant transformer having an output current capacity in excess of the maximum starting current required for the load. This results in a ferroresonant transformer that has an output current handling capability that is very much greater than that required for the steady-state operation of the load. For an electric motor the start-up (or surge) current may be up to eight times the magnitude of the steady-state current. To make a ferroresonant transformer of sufficient capacity to handle the start-up current means a transformer larger in physical size than one designed to handle only the steady-state load and it also means that the inherent current limiting property of ferroresonant transformers cannot be taken advantage of, except in cases of extreme overload.

The present invention overcomes the problems of the prior art by providing an auxiliary winding on the ferroresonant transformer and controlling the transformer in such a manner that, during start-up of a load connected to the transformer, the auxiliary winding provides all the current for the load, and after the initial start-up period of the load, the auxiliary winding is disconnected from the load and the normal secondary winding of the ferroresonant transformer supplies all the current to the load.

Stated in other terms, the present invention is a voltage regulator for an alternating current (AC) load, the voltage regulator comprising:

A ferroresonant transformer having a primary winding for connection to a source of AC power, a secondary winding for selective connection to the AC load, an auxiliary winding for selective connection to the AC load whereby the auxiliary winding is closely coupled to the primary winding and a capacitance means connected across a winding other than the primary or auxiliary windings; a switch means for selectively connecting the auxiliary winding to the AC load for providing power to the load when the switch means is in a first state, and the switch means selectively connecting the secondary winding to the AC load for providing power to the load when the switch means is in a second state; the switch means being responsive to the state of the load such that when the load is unenergized, and for a predetermined time period after the load is energized, the switch means is in its first state, and after the predetermined time period and for as long as the load remains continuously energized, the switch means is in its second state.

Stated in yet other terms, the present invention is a voltage regulator comprising a ferroresonant transformer for supplying regulated AC voltage to a load, wherein the ferroresonant transformer comprises a primary winding, a secondary winding, and a capacitance means connected across the secondary winding, the regulator characterized by an auxiliary winding wound on the ferroresonant transformer such that, ideally, all the flux linking the primary winding of the transformer also links the auxiliary winding, and vice-versa; a switch means for selectively connecting either the auxiliary winding or the secondary winding of the transformer across the load; a control means controlling the switch means in such a manner that when no current is being supplied to the load, and for a predetermined time period after power is applied to the load, the switch means connects the auxiliary winding to the load, and after the predetermined time period the switch means is activated to disconnect the auxiliary winding from the load, and to connect the secondary winding to the load.

Stated in still another manner, the present invention is a voltage regulator for an AC load, the voltage regulator comprising: a ferroresonant transformer having a primary winding for connection to a source of AC power, a secondary winding for selective connection to the AC load, an auxiliary winding for selective connection to the AC load, whereby the auxiliary winding is closely coupled to the primary winding, and a capacitance means connected across a winding other than the primary or auxiliary windings; a control means being responsive to the state of the load such that when the load is unenergized, and for a predetermined time period after the load is energized, the control means being in a first state, and after the predetermined time period, and for as long as the load continues to be energized, the control means being in a second state; a switch means for selectively connecting only the auxiliary winding to the AC load to provide power to the load when the switch means is in a first state, and the switch means selectively connecting only the secondary winding to the AC load to provide power to the load when the switch means is in a second state; the switch means being responsive to the output of the control means such that when the control means is in its first state the switch means is in its first state and when the control means is in its second state the switch means is in its second state.

The invention will now be described in more detail with reference to the accompanying drawings, wherein like parts in each of the several figures are identified by the same reference character, and wherein:

FIG. 1 is a simplified block-schematic diagram of the preferred embodiment of the invention;

FIG. 3 is a simplified block diagram of an alternative embodiment of the invention.

FIG. 1 depicts a simplified block-schematic diagram of the preferred embodiment of the invention. The interconnection of the various components is as shown in FIG. 1 and attention is directed to that Figure.

Figure 2:
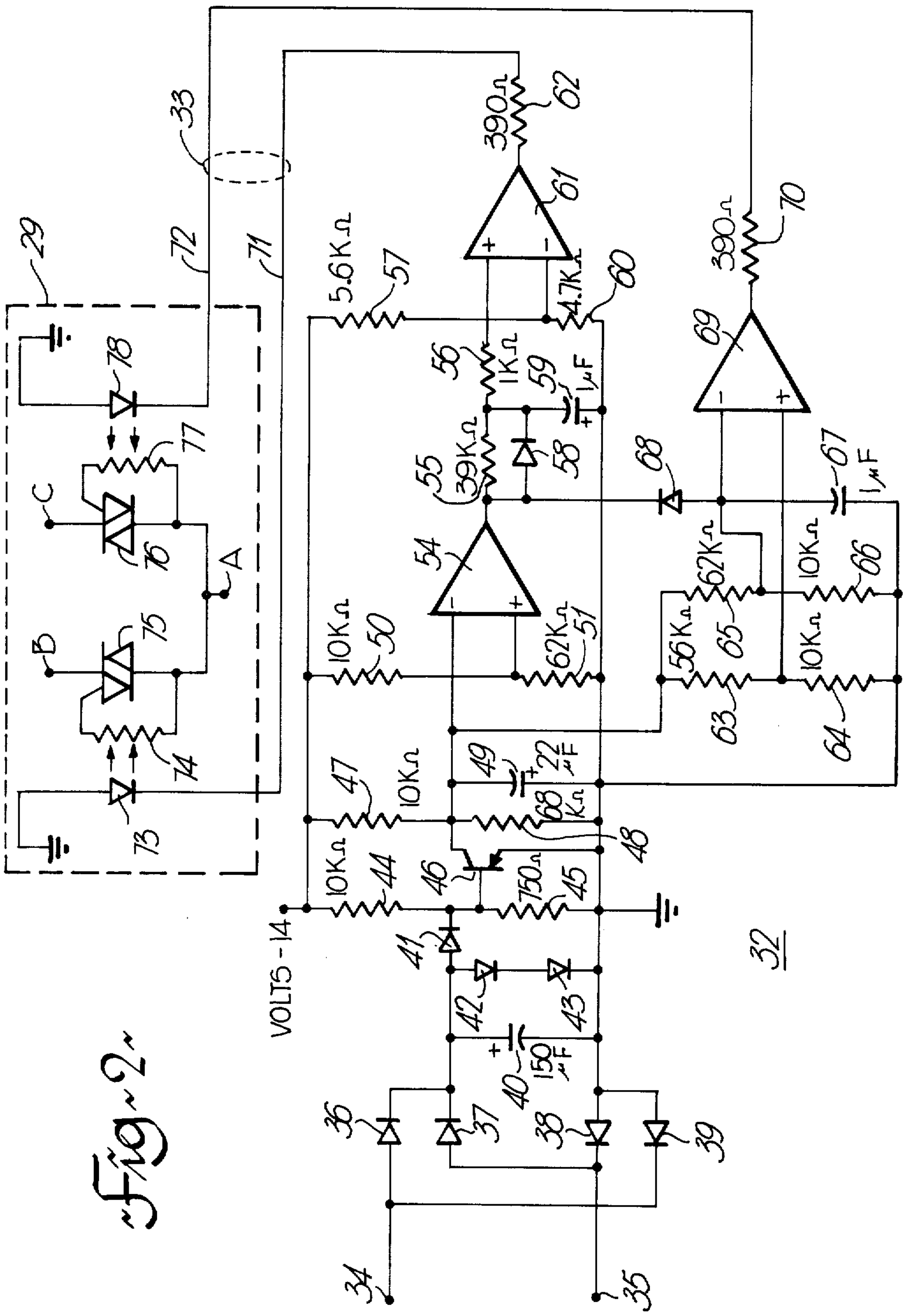
FIG. 2 is a simplified schematic diagram of the control portion of FIG, 1.

In FIG. 1 ferroresonant transformer 10 comprises a primary winding 11, a secondary winding 12 and an auxiliary winding 13 all wound on a ferromagnetic core 14. A magnetic shunt, a portion of core 14, is indicated at 15. It should be noted that, ideally, all the flux linking primary winding 11 also links auxiliary winding 13, and vice-versa. Because of magnetic shunt 15, the flux from secondary winding 12 is not completely linked with windings 11 and 13, but rather, some of the flux from winding 12 is shunted via magnetic shunt 15; similarly some of the flux from windings 11 and 13 is shunted by magnetic shunt 15 and consequently not all of the flux from windings 11 and 13 links with winding 12. Since winding 13 is employed for only a short time period it can be constructed of a smaller gauge wire than would otherwise be possible. In one embodiment constructed by the applicants, winding 13 (designed to carry 20 amperes) was made of No. 17 AWG (American Wire Gauge) wire rather than the No. 11 or 12 AWG wire that would be required for a continuous duty winding.

Winding 11 has a centre tap 16 and the winding 11 is supplied with AC power by inverter 22 from battery 17 via Silicon Controlled Rectifiers (SCRs) 18 and 19. SCRs 18 and 19 are operated as a standard push-pull square wave inverter with an output frequency of 60 Hz. Capacitor 20 and inductor 21 are used to commutate the SCRs 18 and 19 of inverter 22. The firing of SCRs 18 and 19 is achieved by means not shown, in a conventional manner. As inverter 22 is of a type well known in the art, and as it is ancillary to the actual invention being described herein, it is not deemed necessary to describe it in more detail. In the embodiment being described battery 17 has a potential of approximately 48 volts DC and the output of inverter 22 (between tap 16 and one of the ends of winding 11) is approximately 120 volts AC at 60 Hz.

Secondary winding 12 has a tap 23 and ends 24 and 25. The series combination of inductor 26 and capacitor 27 is connected across the ends 24 and 25. The series combination of capacitor 27 and inductor 26 is resonant at 240 Hz and is therefore capacitive at the frequency of operation i.e. 60 Hz. A capacitance such as this across the secondary winding of a ferroresonant transformer is well known. In the embodiment of FIG. 1 a voltage of approximately 600 volts is developed between the ends 24 and 25. The voltage between tap 23 and end 25 (which is the voltage to be applied to load 28) is approximately 120 volts.

As can be seen from FIG. 1, when switch 29 is in the position shown (terminal A connected to terminal B), auxiliary winding 13 is connected across the load 28, and is therfore supplying power to load 28, assuming on-off switch 30 is closed. When switch 29 is in its alternate position (i.e. terminal A connected to terminal C) a portion of secondary winding 12 is connected across the load 28, and is therefore supplying power to load 28, assuming on-off switch 30 is closed.

Transformer 31 is employed as a current transformer which develops a signal on its secondary winding (to which control circuitry 32 is responsive) indicative of the magnitude of the current flowing through load 28. When no current is flowing through load 28, and for a predetermined time period after current starts to flow through load 28, control circuitry 32 is in a first state. After the predetermined time period control circuitry 32 is in a second state. Switch 29 likewise has two states and is responsive to control circuitry 32 as indicated symbolically via the dashed line interconnection 33. When control circuitry 32 is in its first state, switch 29 is likewise in its first state which is as shown in FIG. 1, i.e. terminal A connected to terminal B. When control circuitry 32 is in its second state, switch 29 is likewise in its second state which is terminal A connected to terminal C.

In actual fact, the preferred embodiment employs a solid-state switch for switch 29; but in order to make the switch 29 and its operation easier to visualize it has been shown in FIG. 1 as a simplified mechanical switch 29 with its control link from control circuitry 32 indicated as a dashed line interconnection 33. The simplified circuitry of the preferred switch 29 along with the preferred control circuitry 32 and preferred interconnection 33 is depicted in FIG. 2 to be discussed later.

The operation of FIG. 1 will now be described briefly. Inverter 22 is assumed to be already functioning. When on-off switch 30 is in its open position, as shown, no current flows through load 28 and consequently both control circuitry 32 and switch 29 are in their first states and switch 29 is in the position shown in FIG. 1. When on-off switch 30 is closed current (from auxiliary winding 13) flows through load 28 and is sensed by control circuitry 32 via transformer 31. Once current begins to flow through load 28 control circuitry 32 remains in its first state for a predetermined time period. Consequently switch 29 remains in its first state, as is depicted in FIG. 1 and auxiliary winding 13 remains connected across load 28 and is supplying power thereto. After this predetermined time period (e.g. 0.8 seconds) has elapsed, control circuitry 32 changes to its second state thereby causing switch 29 to change to its second state which results in terminal A being connected to terminal C. The effect of this is that now a portion of secondary winding 12 is connected across load 28 to supply power thereto.

The preferred embodiment of FIG. 1 was designed to power a load 28 which is an electric motor. For this particular application the predetermined delay time in the change of states of control circuitry 32 is approximately 0.8 seconds. The actual delay in the implementation of FIG. 1 will depend upon the starting characteristics of the load 28. According to the spirit of this invention the idea is to employ the auxiliary winding 13 to supply power to load 28 during starting thereof when larger than steady-state currents are required, and then to employ the normal secondary winding 12 of the ferroresonant transformer 10 when the current drawn is approximately that of the steady-state condition.

FIG. 2, depicting the preferred embodiment of switch 29, control circuitry 32, and interconnection 33 in simplified form will now be discussed. The interconnection of the various components is as shown in FIG. 2 and attention is directed to that Figure.

Diodes 36, 37, 38 and 39 are connected to terminals 34 and 35 in the form of a standard bridge rectifier. When there is current flowing through load 28 (FIG. 1) a voltage is developed across capacitor 40 via transformer 31 and diodes 36, 37, 38 and 39. When the current in the secondary winding of transformer 31 reaches approximately 175 milliamperes (mA), the voltage across capacitor 40 is of sufficient magnitude to turn off transistor 46. Diodes 42 and 43 protect the base of transistor 46 from excessive voltage magnitude on capacitor 40 due to large currents sensed by transformer 31.

Once transistor 46 is turned off, the voltage across capacitor 49 begins to increase in magnitude as it becomes charged via resistor 47. After a delay of approximately 0.8 seconds (since capacitor 49 began to charge), the voltage applied to the inverting (−) input of operational amplifier 54 is of sufficient magnitude to cause the output of amplifier 54 to change to a low (i.e. approximately −1 volt) voltage value from its previous high value (near −12 volts). This results in capacitor 59 being immediately discharged by diode 58, and the output of operational amplifier 61 is switched to a low voltage level (approximately −1 volt). The fact that the output of amplifier 61 is low means that light emitting diode (LED) 73 is not emitting light and consequently TRIAC (bidirectional triode thyristor) 75 is turned off. Additionally, diode 68 is no longer supplying bias to capacitor 67, and consequently capacitor 67 discharges via resistor 66.

After a short delay (until capacitor 67 has discharged sufficiently), of sufficient length to prevent any possibility of both TRIAC 75 and TRIAC 76 being on simultaneously, the output of operational amplifier 69 switches high (i.e. approximately −12 volts). This turns on LED 78 causing it to emit light and thereby cause TRIAC 76 to be turned on and conducting.

When the magnitude of the current in the secondary winding of transformer 31 falls below approximately 175 mA., transistor 46 turns on and consequently capacitor 49 discharges. The output of operational amplifier 54 switches to a high voltage level (approximately −12 volts) causing capacitor 67 to become charged via diode 68, and the output of operational amplifier 69 switches to a low voltage level (approximately −1 volt) ultimately causing TRIAC 76 to be nonconducting. After a short delay (caused by capacitor 67 charging to a sufficient voltage level) capacitor 59 becomes charged via resistor 55, and the output of operational amplifier 61 switches to a high voltage level, causing LED 73 to turn on and emit light, and ultimately cause TRIAC 75 to be in the conducting mode. The delay in turning on LED 73, caused by the fact that capacitor 67 must first become charged, ensures that both TRIAC 75 and TRIAC 76 are not both conducting at the same time.

It should be noted that operational amplifiers 54, 61 and 69 are of the type manufactured by Texas Instruments and referred to by the manufacturer as μA747.

The preceding description of FIGS. 1 and 2 has been a description of the preferred embodiment of the invention, as envisioned by the inventor for one particular application. Various and sundry modifications can be made to the preferred embodiment described herein. Some of these modifications which are deemed to be within the scope of the invention, are described in the following section.

FIG. 3 is a variation of the circuit shown in FIG. 1. In FIG. 3, the voltage across load 28 is sensed rather than the current through load 28 (as is depicted in FIG. 1). In FIG. 3, the switch 29 and load 28 are interconnected in the same fashion as shown in FIG. 1. The difference in FIG. 3 is that the control circuitry 32 is in series with resistor 80 and the combination of circuitry 32 and resistor 80 is connected across load 28 as shown in FIG. 3. The purpose of resistor 80 is to act as a voltage dropping resistance so that the range of voltages (and consequently currents) appearing between terminals 34 and 35 in the FIG. 3 configuration is approximately the same as the range of voltages (and currents) appearing between terminals 34 and 35 in the FIG. 1 configuration. Control circuitry 32, interconnection 33 and switch 29 are the same and operate the same in the FIG. 3 configuration as they did in the FIG. 1 configuration.

Figure 4:
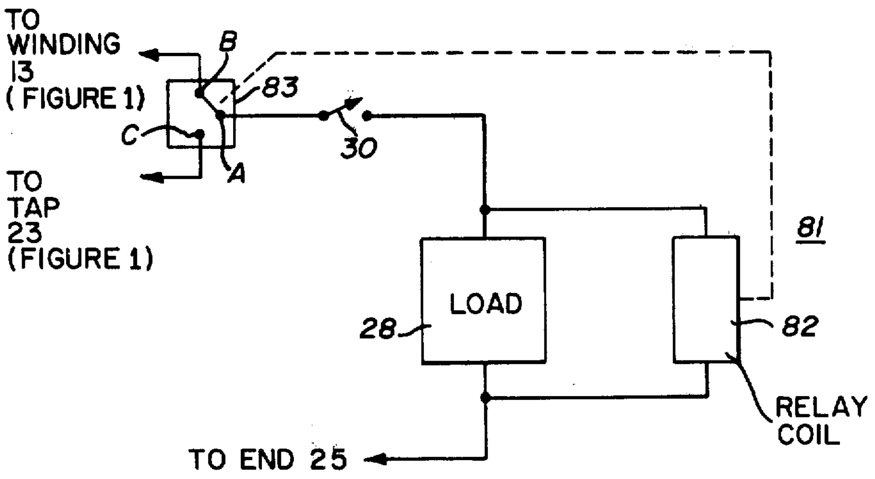
FIG. 4 is a simplified block diagram of another alternative embodiment of the invention.

Additionally, instead of the electronic control circuitry 32 of FIG. 3, a standard relay 81 could be employed as shown in FIG. 4. The coil 82 of the relay would be connected across the load 28 and the contacts 83 of the relay 81 would be connected so as to duplicate the switching function performed by switch 29 of FIG. 3.

In essence, in FIG. 1, control circuitry 32 is designed to begin timing once switch 30 is closed, and after a predetermined time period, switch 29 is caused to change its state from that shown in FIG. 1 to its alternate state, via interconnection 33. An alternative to this would be to monitor the magnitude of the current and when the current reaches approximately its steady-state magnitude (or any other desired magnitude), switch 29 is caused to operate.

What is claimed is:

1. A voltage regulator for an alternating current (AC) load, said voltage regulator comprising:
   - a ferroresonant transformer having a primary winding for connection to a source of AC power, a secondary winding for selective connection to said AC load, an auxiliary winding for selective connection to said AC load whereby said auxiliary winding is closely coupled to said primary winding, and a capacitance means connected across a winding other than said primary or auxiliary windings;
   - a switch means for selectively connecting said auxiliary winding to said AC load for providing power to said load when said switch means is in a first state, and said switch means selectively connecting said secondary winding to said AC load for providing power to said load when said switch means is in a second state;
   - said switch means being responsive to the state of said load such that when said load is unenergized, and for a predetermined time period after said load is energized, said switch means is in its first state, and after said predetermined time period and for as long as said load remains continuously energized, said switch means is in its second state.

2. The voltage regulator of claim 1 wherein said switch means is an electromechanical relay having its coil connected in parallel to said load.

3. The voltage regulator of claim 1 further including a control means responsive to the current through said load such that when no current is flowing through said load, and for a predetermined time period after current begins to flow through said load, said control means being in a first state, and after said predetermined time period, and for as long as current continues to flow through said load, said control means being in a second state;

said switch means being responsive to the output of said control means such that when said control means is in its first state said switch means is in its first state and when said control means is in its second state said switch means is in its second state.

4. The voltage regulator of claim 3 wherein said switch means is a solid-state device.

5. The voltage regulator of claim 3 wherein said switch means comprises two TRIACS; a first TRIAC is connected intermediate said auxiliary winding and said load, and a second TRIAC is connected intermediate said secondary winding and said load; said first TRIAC responsive to a first signal from said control means and said second TRIAC responsive to a second signal from said control means.

6. The voltage regulator of claim 3, 4 or 5 wherein said predetermined time period is 0.8 seconds.

7. A voltage regulator comprising a ferroresonant transformer for supplying regulated AC voltage to a load, wherein said ferroresonant transformer comprises a primary winding, a secondary winding, and a capacitance means connected across said secondary winding, said regulator characterized by:

an auxiliary winding wound on said ferroresonant transformer such that, ideally, all the flux linking the primary winding of said transformer also links said auxiliary winding, and vice-versa;

a switch means for selectively connecting either said auxiliary winding or the secondary winding of said transformer across said load;

a control means controlling said switch means in such a manner that when no current is being supplied to said load, and for a predetermined time period after power is applied to said load, said switch means connects said auxiliary winding to said load, and after said predetermined time period said switch means is activated to disconnect said auxiliary winding from said load, and to connect said secondary winding to said load.

8. The voltage regulator of claim 7 wherein said switch means is a solid-state device and wherein said predetermined time period is 0.8 seconds.

9. A voltage regulator for an AC load, said voltage regulator comprising:

a ferroresonant transformer having a primary winding for connection to a source of AC power, a secondary winding for selective connection to said AC load, an auxiliary winding for selective connection to said AC load, whereby said auxiliary winding is closely coupled to said primary winding, and a capacitance means connected across a winding other than said primary or auxiliary windings;

a control means being responsive to the state of said load such that when said load is unenergized, and for a predetermined time period after said load is energized, said control means being in a first state, and after said predetermined time period, and for as long as said load continues to be energized, said control means being in a second state;

a switch means for selectively connecting only said auxiliary winding to said AC load to provide power to said load when said switch means is in a first state, and said switch means selectively connecting only said secondary winding to said AC load to provide power to said load when said switch means is in a second state;

said switch means being responsive to the output of said control means such that when said control means is in its first state said switch means is in its first state and when said control means is in its second state said switch means is in its second state.

10. The voltage regulator of claim 9 wherein said control means is responsive to the flow of current through said load, and wherein said capacitance means is connected across said secondary winding.

11. The voltage regulator of claim 9 wherein said control means is responsive to the voltage applied across said load.

* * * * *